(12) United States Patent
Heuler et al.

(10) Patent No.: US 7,588,130 B2
(45) Date of Patent: Sep. 15, 2009

(54) HYDRODYNAMIC CLUTCH DEVICE

(75) Inventors: Michael Heuler, Würzburg (DE);
Jürgen Ackermann, Schweinfurt (DE);
Thomas Adelmann, Retzstadt (DE);
Christoph Gajda, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 295 days.

(21) Appl. No.: 11/374,746

(22) Filed: Mar. 14, 2006

(65) Prior Publication Data
US 2006/0207851 A1    Sep. 21, 2006

(30) Foreign Application Priority Data
Mar. 15, 2005   (DE) ................ 10 2005 012 242

(51) Int. Cl.
*F16H 45/02* (2006.01)
(52) U.S. Cl. ...................... 192/3.3; 192/3.33
(58) Field of Classification Search ................ 192/3.29, 192/3.3
See application file for complete search history.

(56) References Cited

U.S. PATENT DOCUMENTS

| 3,647,037 | A | * | 3/1972 | Toma ................. 192/106 F |
| 4,002,228 | A | * | 1/1977 | Borman ............... 192/3.3 |
| 4,949,822 | A | * | 8/1990 | Martin ............... 192/3.3 |
| 4,969,543 | A | * | 11/1990 | Macdonald ........... 192/3.29 |
| 5,441,135 | A | * | 8/1995 | Worner et al. ........ 192/3.29 |
| 5,501,309 | A | * | 3/1996 | Walth et al. ......... 192/3.29 |
| 5,575,363 | A | * | 11/1996 | Dehrmann et al. ..... 192/3.3 |
| 5,590,750 | A | * | 1/1997 | Graton et al. ........ 192/3.29 |
| 5,762,172 | A | * | 6/1998 | Tsukamoto et al. .... 192/3.29 |
| 5,984,065 | A | * | 11/1999 | Teramae et al. ...... 192/3.28 |
| 6,193,036 | B1 | * | 2/2001 | Arhab et al. ........ 192/3.29 |
| 6,397,996 | B1 | * | 6/2002 | Yabe ................ 192/55.61 |
| 6,705,447 | B2 | * | 3/2004 | Gorman et al. ....... 192/85 AA |
| 7,000,747 | B2 | * | 2/2006 | Back et al. ......... 192/3.3 |

FOREIGN PATENT DOCUMENTS

| DE | 44 23 640 | 6/1995 |
| EP | 0 409 088 | 1/1991 |
| JP | 53-032264 | 3/1978 |
| JP | 05-296313 | 11/1993 |
| JP | 10-1482249 | 6/1998 |
| JP | 2001-132819 | 5/2001 |
| JP | 2002-310262 | 10/2002 |

* cited by examiner

*Primary Examiner*—Rodney H Bonck
(74) *Attorney, Agent, or Firm*—Cohen Pontani Lieberman & Pavane LLP

(57) ABSTRACT

A hydrodynamic clutch device includes a pump wheel, a housing connecting the pump wheel to a drive, a turbine wheel connected to a takeoff, the turbine wheel being located in the housing and cooperating with the pump wheel to form a hydrodynamic circuit, and a bridging clutch located in the housing and having a piston located between the hydrodynamic circuit and a pressure space. The piston is movable between an engaged position and a released position. At least one through opening in the piston allows an exchange of clutch fluid between the hydrodynamic circuit and the pressure space regardless of the position of the piston and a non-return valve allows only flow from the hydrodynamic circuit to the pressure space when the clutch is released.

9 Claims, 3 Drawing Sheets

HYDRODYNAMIC CLUTCH DEVICE

BACKGROUND OF THE INVENTION

1. Field of the Invention

The invention pertains to a hydrodynamic clutch device of the type having a pump wheel; a housing connecting the pump wheel to a drive; a turbine wheel connected to a takeoff, the turbine wheel being located in the housing and cooperating with the pump wheel to form a hydrodynamic circuit; and a bridging clutch located in the housing and having a piston located between the hydrodynamic circuit and a pressure space, the piston being movable between an engaged position, wherein the drive transmits torque to the takeoff via the bridging clutch, and a released position, wherein the drive transmits torque to the takeoff via the hydrodynamic circuit.

2. Description of the Related Art

U.S. Pat. No. 5,575,363 describes a hydrodynamic clutch device designed as a hydrodynamic torque converter. This device comprises a clutch housing, which is brought into connection in the conventional manner for rotation in common with a drive, such as an internal combustion engine, and a pump wheel, which works together with a turbine wheel and a stator to form a hydrodynamic circuit. Whereas the turbine wheel is connected nonrotatably to the takeoff, such as a gearbox input shaft, the stator is mounted by way of a freewheel on a support shaft, which is provided radially between a pump wheel hub and the gearbox input shaft. In addition, the hydrodynamic clutch device has a bridging clutch with a piston, which is connected nonrotatably but with freedom of axial movement to the clutch housing.

The hydrodynamic clutch device is designed as a two-line system, as a result of which the following pressure and flow conditions are produced:

A first pressure-medium line is connected to a first flow route, which has flow channels radially between the pump wheel hub and the support shaft and additional flow channels radially between the support shaft and the gearbox input shaft. This first pressure-medium line is formed by flow channels provided in the thrust washers located on both sides of the freewheel of the stator. Clutch fluid is supplied to the hydrodynamic circuit through these channels. When there is a positive pressure in the hydrodynamic circuit, the piston is pushed toward the adjacent housing cover of the clutch housing; friction surfaces then allow the piston to be carried along rotationally by the clutch housing. Conversely, this rotation in common produced by the friction surfaces is released when, through a second pressure-medium line, a pressure space assigned to the piston and located axially between the piston and the housing cover is supplied with a positive pressure versus the hydrodynamic circuit, as a result of which the piston is pushed axially toward the hydrodynamic circuit. The second pressure-medium line is connected to a second flow route, which passes by way of a center bore in the gearbox input shaft. Each of the two flow routes is connected to a fluid reservoir.

The essential principle of a two-line system of this type—but also its essential disadvantage—is the presence of the bridging clutch as a separation point between the hydrodynamic circuit and the pressure space. When the bridging clutch is open, therefore, a connection exists between the hydrodynamic circuit and the pressure space, which allows the pressure to equalize at least in the area of the radial extension of the bridging clutch, whereas, when the bridging clutch is closed, a pressure which can differ considerably from that in the pressure space can easily build up in the hydrodynamic circuit, even in direct proximity to the bridging clutch. This situation is not changed even if grooves are provided in the bridging clutch, because, measured against the total amount of clutch fluid supplied to the hydrodynamic circuit and the pressure space, such grooving never allows more than a very small leakage flow to pass through and is thus unable to exercise any noticeable effect on the pressure conditions in the two pressure spaces.

Especially during operation in push mode, that is, when the takeoff rpm's are higher than the drive rpm's, this situation has disadvantageous effects as soon as the bridging clutch is to be closed for the purpose of taking advantage of the braking action of the drive to reduce or avoid a long period of efficiency-impairing slippage or to prevent an unbraked acceleration of the drive upon a sudden transition from push mode to pull mode. The following unpleasant effect then occurs:

As a result of the filling of the hydrodynamic clutch device with clutch fluid, this fluid pushes its way radially outward under the effect of centrifugal force, and ideally we can assume a pressure of "zero" at the center of rotation of the clutch device. As the distance from the center of rotation increases, however, the pressure values increase monotonically, near-maximum values being reached in the area of the radial extension of the bridging clutch, which is usually located in the radially outer area of the device. The increase in these pressure values during operation in push mode is more pronounced in the hydrodynamic circuit than in the pressure space, because the clutch fluid in the pressure space rotates essentially at the same speed as the clutch housing, whereas in the hydrodynamic circuit it rotates at the higher takeoff-side speed of the turbine wheel. Under consideration of the boundary condition that, when the bridging clutch is open, the pressure conditions within the area of the radial extension of the bridging clutch are equalized between the hydrodynamic circuit and in the pressure space, the difference between the pressure-increase curves on the two sides of the piston have the effect that the course of the pressure increase in the pressure space—starting from the area of the radial extension of the bridging clutch and leading radially inward from there—undergoes less of a pressure drop than the course of the pressure increase on the opposite side of the piston, that is, in the hydrodynamic circuit. The consequence of this is that the pressure in the part of the pressure space radially inside the bridging clutch is higher than that in the hydrodynamic circuit, as a result of which the piston is held stably in the released position. If, under these conditions, an actuating command is given to close the bridging clutch, a positive pressure must first be built up in the hydrodynamic circuit which significantly exceeds the pressure in the pressure space. There is a therefore a considerable delay in the closing of the bridging clutch.

As soon as the piston of the bridging clutch starts moving toward its engaged position after the necessary high positive pressure has been built up in the hydrodynamic circuit, the connection between the hydrodynamic circuit and the pressure space becomes smaller and thus acts increasingly as a throttle, which has the effect of lowering the pressure in the pressure space below that present in the hydrodynamic circuit and thus ultimately causes the sign of the axial force acting on the piston to reverse. Although the piston would thus now be able to shift into its engaged position by itself, the high positive pressure built up in the hydrodynamic circuit—which had no effect previously while the piston was not moving—now goes suddenly into effect, exerting a strong axial force which accelerates the engaging movement of the piston, so that the piston travels at a very high velocity over the last part of its engaging stroke and thus enters into working connection with the axially adjacent, drive-side component of the clutch housing, such as, for example, a housing cover, in a very abrupt manner. As a result, the speed difference previously existing between the drive and the takeoff disappears within a very short time. In a vehicle traveling in push mode, this process is felt as an unpleasantly hard torque surge, which detracts from the comfort of the vehicle's passengers and also reduces the service life of the clutch device itself.

SUMMARY OF THE INVENTION

The invention is based on the task of designing a hydrodynamic clutch device with a bridging clutch which can be closed without causing a surge in the torque even during operation in push mode.

According to the invention, the bridging clutch is accommodated in the hydrodynamic circuit and a sealing site is installed between the circuit and the pressure space in the form of a seal assigned to the piston of the bridging clutch, with the result that when the piston travels within its range of movement between the released position and the engaged position, there is no change in the working direction of the pressure-induced axial force being exerted on the piston. This advantageous effect is achieved for the reason that, when the bridging clutch is accommodated in the hydrodynamic circuit, there is no pressure drop at the bridging clutch even when the piston is displaced, regardless of whether the bridging clutch ends up being open or closed. Simultaneously, the sealing site between the two pressure areas required for the realization of a two-line system, namely, between the hydrodynamic circuit and the pressure space, is provided not in the otherwise conventional friction area of the bridging clutch but rather at a different point in the hydrodynamic clutch device, namely, in the area of the piston. The sealing site between the hydrodynamic circuit and the pressure space thus becomes independent of the position which the piston may occupy relative to the components of the bridging clutch such as the plates.

It is true that, as a result of this design of the hydrodynamic clutch device, pressure-increase curves which rise in an essentially monotonic manner between the axis of rotation and the area of the radial extension of the bridging clutch develop both in the hydrodynamic circuit and in the pressure space. Because of the higher rotational speed of the turbine wheel on the takeoff side in push mode, the pressure curve in the hydrodynamic circuit rises more quickly than that in the pressure space on the opposite side of the piston. Because of the special arrangement of the sealing site between the hydrodynamic circuit and the pressure space, however, achieved by assigning the seal to the piston, these two pressure-increase curves will not interact in such as way as to create any pressure-induced effects which could influence the shifting behavior of the bridging clutch, namely, by allowing the direction of the axial force acting on the piston to reverse. The pressure supply of the hydrodynamic circuit is sufficient to keep the piston in its released position as long as it is supposed to remain there. To engage the piston, the filling of the pressure space is sufficient to give the piston the tendency to engage as soon as the pressure in the pressure circuit connected to the pressure supply is turned off and thus the pressure supply to both the hydrodynamic circuit and to the pressure space is briefly interrupted. Thus—as soon as the pressure space is connected to the pressure supply again—even a very slight positive pressure in the pressure space versus the hydrodynamic circuit is sufficient to move the piston and thus to control with great sensitivity the closing behavior of the bridging clutch. Upon reaching its engaged position, the piston thus makes soft contact with the corresponding drive-side component of the clutch housing such as the housing cover without producing any surge in the torque surge. To this extent the passengers of a vehicle equipped with this type of clutch device will enjoy a very comfortable ride.

Because even a very slight positive pressure in the pressure space is sufficient to move the piston into its engaged position even during operation in push mode, this closing movement takes place with almost no delay, which means that performance-reducing and/or efficiency-impairing operating phases of the hydrodynamic clutch device can be almost completely avoided even during operation in push mode. Of course, even when an abrupt transition is made from push mode to pull mode, the quickness of the reaction by which the bridging clutch is closed also means that the drive, which would be nearly free of inertia because of the absence of load on the takeoff side, is prevented from racing.

If the sealing site between the hydrodynamic circuit and the pressure space were to be installed in the conventional place, namely, in the friction area of the bridging clutch, a set of grooves, provided to promote a cooling effect on these friction areas and acting as a throttle, would have to be designed with extreme care and precision to ensure specific pressure conditions both in the hydrodynamic circuit and in the pressure space and also to make possible a defined volume flow rate of incoming and outgoing clutch fluid. When, in combination with the inventive pressure area connection, however, the seal is assigned to the piston as in the present invention, there is no longer any need to optimize the grooves with respect to their throttling effect; on the contrary, the grooves can be designed only to ensure the effective transfer of heat to the clutch fluid.

According to an especially advantageous embodiment, the flow in the hydrodynamic clutch device is guided in such a way that, at least when the bridging clutch is closed, the flow of fresh clutch fluid is positively guided through an inventive pressure area connection to the bridging clutch. For this purpose, a fluid space separator, which is connected to the clutch housing, is assigned to the piston of the bridging clutch. After fresh clutch fluid has passed from the pressure space and through the pressure area connection, this fluid space separator diverts this clutch fluid toward the bridging clutch, so that the clutch fluid cannot flow into the hydrodynamic circuit itself until it has flowed through the bridging clutch.

It is preferable for the fluid space separator to take over additional functions, such as the function of a support, which can absorb the axial force exerted by the piston when it is in its engaged position, and the function of an anti-twist device for any plates which may be assigned to the bridging clutch, which means that the fluid space separator can also act as a plate carrier.

Because, when the bridging clutch is open or at least partially open, the hydrodynamic clutch device can be operated with considerable slip, depending on the operating mode, and there can thus be a considerable loss of power in the form of waste heat, which is transferred to the clutch fluid, it can be advisable to supplement the pressure area connection with a clutch fluid let-through device to increase the flow volume of clutch fluid. The clutch fluid let-through device can allow different volume flow rates of clutch fluid to pass in opposite flow directions. When the clutch fluid let-through device is designed as a nonreturn valve, the clutch fluid let-through device can increase the volume flow rate of clutch fluid from the hydrodynamic circuit into the pressure space by opening an additional flow channel, which supplements the pressure area connection. The nonreturn valve prevents flow in the opposite direction, however, and thus only the pressure area connection is available for the passage of clutch fluid. When the nonreturn valve is designed as a mushroom-head valve, the valve is preferably designed with a sealing cover, which can press against the second wall of the pressure chamber. It is advantageous for this wall to be the corresponding wall of the piston. The valve also has a stem, which is received in a guide opening in the second wall so that it cannot be lost but can shift position in the axial direction and which, like the sealing cover, can be made of plastic. The flow opening can be opened or closed by the sealing cover as a function of the pressure difference present at the moment in question between the two sides of the sealing cover.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
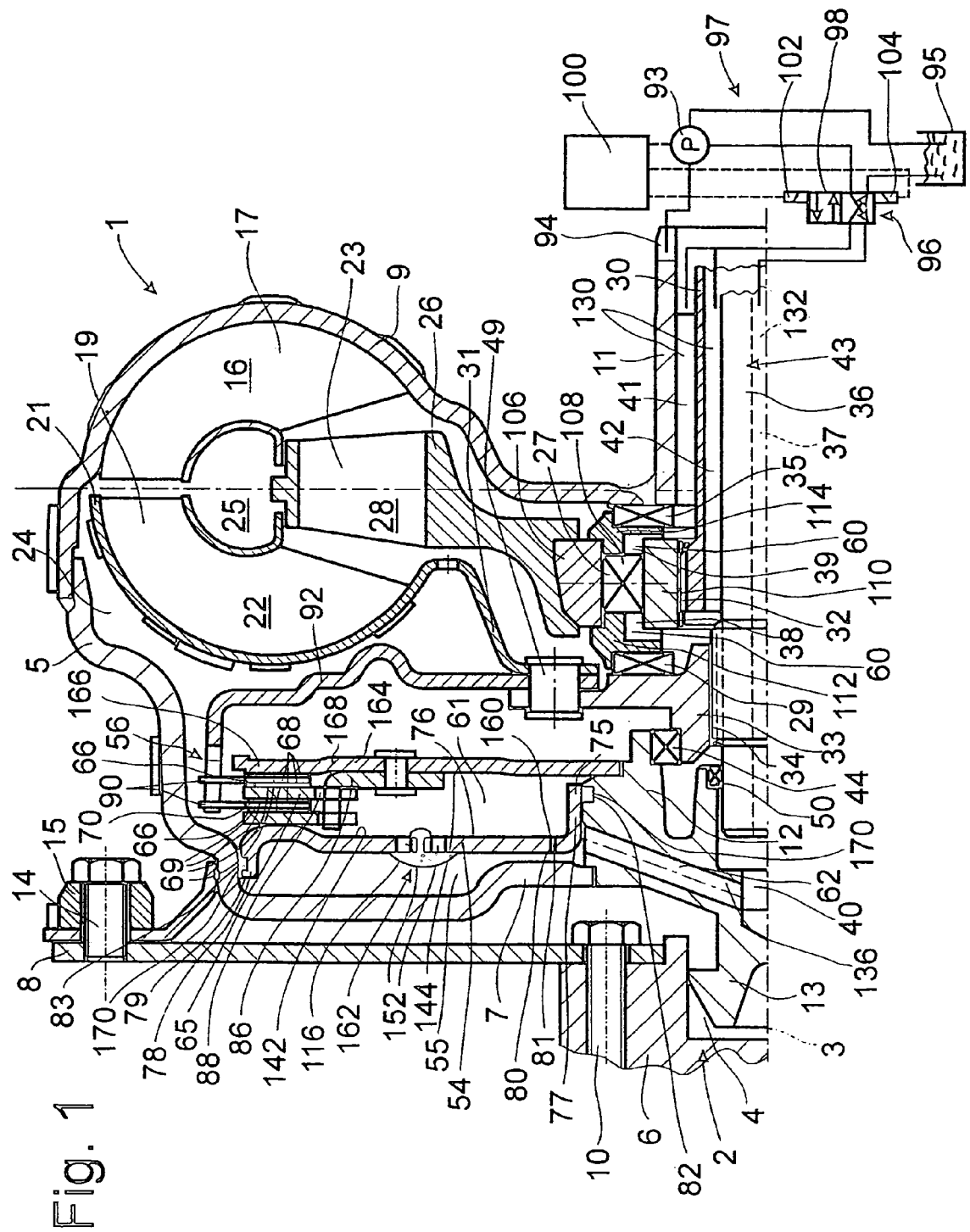
FIG. 1 shows the upper half of a longitudinal section through a hydrodynamic torque converter with a bridging clutch of the two-line design equipped with a piston.

FIG. 1 shows a hydrodynamic clutch device 1 in the form of a hydrodynamic torque converter, which is able to execute rotational movement around an axis of rotation 3. The hydrodynamic torque converter has a clutch housing 5 with a housing cover 7 on the side facing a drive 2, such as an internal combustion engine with a crankshaft 6. The clutch housing 5 is permanently connected to a pump wheel shell 9. This shell merges in its radially inner area with a pump wheel hub 11.

In its radially inner area, the housing cover 7 has a journal hub 12, which carries a bearing journal 13. The bearing journal 13 is held in a recess 4 in the crankshaft 6 for the purpose of centering the clutch housing 5 on the drive side. The housing cover 7 also has a fastening mount 15, by which the clutch housing 5 is fastened to the crankshaft by way of a flexplate 8, this being accomplished by the use of fastening elements 14, preferably in the form of screws. The flexplate 8 for its own part is fastened to the crankshaft 6 by fastening elements 10, also preferably in the form of screws.

The previously mentioned pump wheel shell 9 works together with pump wheel vanes 16 to form a pump wheel 17. The pump wheel interacts with a turbine wheel 19, which has both a turbine wheel shell 21 and turbine wheel vanes 22, and with a stator 23. The latter has stator vanes 28 on a stator hub 26 and forms, together with the pump wheel 17 and the turbine wheel 19, a hydrodynamic circuit 24, which encloses an internal torus 25.

The stator 23 is mounted by its hub 26 on an outer body 106 of a freewheel 27, which is mounted by way of a rolling element part 108 on an inner body 110. Acting by way of a drive-side thrust washer 112 and a takeoff-side thrust washer 114, both of which are free of grooves, the outer body 106 centers the inner body 110 and is itself supported axially on the drive side via the drive-side thrust washer 112, a drive-side axial bearing 29, a torsional vibration damper 18, and a bearing 44 against the journal hub 12, whereas, on the takeoff side, it is supported via the takeoff-side thrust washer 114 and a takeoff-side axial bearing 35 against the pump wheel hub 11.

The stator 23 is connected nonrotatably but with freedom of axial movement to a support shaft 30 by means of a set of teeth 32 on the inner body 110 of its freewheel 27; this support shaft is mounted in such a way that it creates an essentially ring-shaped, radially outer flow channel 41, located radially inside the pump wheel hub 11. The support shaft 30, which is designed as a hollow shaft, encloses in turn a gearbox input shaft 36, which acts as a takeoff 43, thus creating an essentially ring-shaped flow channel 42. The gearbox input shaft is provided with a center bore 37 for the passage of clutch fluid. Whereas the two flow channels 41, 42 are provided to serve as the first flow route 130, the center bore 37 serves as a the second flow route 132.

The gearbox input shaft 36 has a set of teeth 34 by which it accepts the previously mentioned turbine wheel hub 33 in nonrotatable but axially movable fashion, the turbine wheel hub 33 being sealed by a seal 50. By means of through-rivets 49, the turbine wheel hub 33 is connected nonrotatably both to a turbine wheel base 31 of the turbine wheel 19 and to an outer plate carrier 92 of a bridging clutch 56.

The previously mentioned flow channels 41, 42 lead to a first pressure medium line 60, which communicates via channels (not shown) in at least one of the thrust washers 112, 114 with the hydrodynamic circuit. In addition, there is a transition space 40 in the journal hub 12, which connects the center bore 37 in the gearbox input shaft 36 to the second pressure medium line 62. The second pressure medium line is in the form of at least one channel 136, which passes with a radial component through the journal hub 12 and opens out into a pressure space 55 located axially between the housing cover 7 and a piston 54 of the bridging clutch 56. The side of the piston 54 facing away from the pressure space 55 forms a first wall 142 of a piston space 61, which is bounded on the side facing the turbine wheel 19 by a second wall 144, which, for the functional reasons explained below, is referred to in the following as the fluid space separator 164. This is mounted on the journal hub 12.

At its radially inner end 77, the piston 54 has a pressure area connection 160 in the form of a throttle point 80 with at least one through-opening 81, which connects the pressure space 55 to the piston space 61, which is functionally assigned to the hydrodynamic circuit 24. In the radially central area 76, the piston 54 can also be designed with a clutch fluid let-through device 162 in the form of a nonreturn valve 116, the design, manner of operation, and function of which will be discussed in detail elsewhere. An axial shoulder 75 is formed at the radially inner end 77 of the piston 54, and another axial shoulder 78 is formed at the radially outer end 79. On the radial side facing the clutch housing 5, the shoulder 78 has a recess to hold a piston seal 83. On the radial side facing the shoulder 75, the hub 12 has a recess to hold the piston seal 82. These seals come into radial contact with their assigned points on the clutch housing 5 and the shoulder 75; that is, the seal 82 rests against the shoulder 75, and the seal 83 rests against the housing cover 7. The two piston seals 82, 83 thus together form the seal 170.

Depending on whether the first pressure-medium line 60 or the second pressure-medium line 62 is actuated and thus depending on the pressure relationships in the hydrodynamic circuit 24 and in the pressure space 55, the piston 54 can be moved in the axial direction between two different limit positions, namely, between its engaged position and its released position, which will be discussed in greater detail below.

Radially outer plates 66, which are connected nonrotatably by a set of teeth 90 to the radially outer plate carrier 92, are mounted axially between the piston 54 and the fluid space separator 164, in the radially outer area of both. The outer plates can be brought into engagement with radially inner plates 65, which are connected nonrotatably by a set of teeth 88 to a radially inner plate carrier 86, which is attached to the fluid space separator 164. The radially outer plates 66 are provided with friction linings 68 on both sides, where the two friction linings 68 facing the same radially inner plate 65 cooperate with friction zones on the radially inner plate 65 to form friction areas 69. A friction area 69 is also created by the friction lining 68 facing away from the radially inner plate 65 on the takeoff-side and by the friction zone on the fluid space separator 164. The radially inner plate adjacent to the piston 54 carries the piston 54 along with it so that they rotate essentially in common, at least when the piston 54 is engaged and is exerting axial force on the plate.

The individual friction areas 69 are activated as soon as the friction linings 68 enter into working connection with their assigned friction zones, which happens as a result of the movement of the piston 54 into its engaged position and thus the closing of the bridging clutch 56. The engagement of the piston 54 is complete when the piston 54 has moved axially as far as it can, within its axial range of movement, toward the fluid space separator 164. To initiate the engagement process, the pressure in the pressure space 55 must be increased until it is higher than that in the hydrodynamic circuit 24. Because the hydrodynamic circuit is connected to the piston space 61 by way of the bridging clutch 56, and because the bridging clutch 56 has grooves 70 in the area of the friction linings 68, the piston space 61 is to be considered part of the hydrodynamic circuit 24, especially when these grooves 70 are of a size or number which allows a comparatively high volume flow rate of clutch fluid to pass through.

Conversely, the individual friction areas 69 are deactivated as soon as the working connection between the friction linings 68 and their assigned friction zones is released, which is accomplished by the disengagement of the piston 54. The disengaging movement of the piston 54 is over when the piston has moved axially as far as it can within its range of axial movement toward the housing cover 7. To initiate the disengaging process, the pressure in the hydrodynamic circuit 24 and thus in the piston space 61 must be increased until it is higher than that in the pressure space 55.

The piston 54 of the bridging clutch 56 is engaged and disengaged as follows:

The previously mentioned flow channels 41, 42, the former located radially between the pump wheel hub 11 and the support shaft 30, the latter between the support shaft 30 and the gearbox input shaft 36, supply the hydrodynamic circuit 24 and thus the piston space 61 with clutch fluid via the first pressure-medium line 60, whereas the center bore 37 in the gearbox input shaft 36 supplies the pressure space 55 with clutch fluid via the transition space 40 and the second pressure-medium lines 62. To guarantee the correct supply in each case, a pressure circuit 97, sketched in FIG. 1, is required. This circuit comprises a pressure source 93, driven in the conventional manner by a drive cam 94 on the pump wheel hub 11, whereas its suction side S can be connected to a fluid reservoir 95 and its delivery side D either to the flow channels 41, 42 or to the center bore 37. The clutch fluid is supplied to the flow channels 41, 42 or to the center bore 37 in accordance with the commands transmitted by an open-loop or closed-loop control unit 100, which is referred to in brief as the controller 100, and which is in working connection both with a switching device 96 in the form of a switching valve 98 installed in the pressure circuit 97 and with the pressure source 93. Preferably the switching valve 98 is designed as a 4/2-port directional control valve, actuated by electromagnets 102, 104, which actuate the switching device 96 in accordance with the commands transmitted by the controller 100.

FIG. 1 shows the situation with the piston 54 in the engaged position. To disengage the piston 54, the switching device 96 is actuated by the electromagnet 102 driven by the controller 100 in such a way that the magnet pushes the switching valve 88 from the position shown in FIG. 1 to a second position, in which the delivery side D of the pressure source 93 is connected to the flow channels 41, 42. The pressure in the channels therefore increases, whereas it decreases simultaneously in the center bore 37 of the gearbox input shaft 36, which is now connected via the switching valve 98 to the fluid reservoir 95.

The clutch fluid which has entered the flow channels 42 arrives via the first pressure-medium line 60 in the hydrodynamic circuit 24. From there, it passes through the grooves 70 in the friction linings 68 and enters the piston space 61, where it acts on the piston 54, pushing it toward the pressure space 55, which empties through the second pressure-medium line 62. Because of the positive pressure thus building up in the piston space 61 versus the pressure space 55, force is exerted on the takeoff-side wall of the piston 54, as a result of which the displacement of the piston 54 toward the housing cover 7 is initiated.

As clutch fluid continues to enter the hydrodynamic circuit 24, it easily passes through the area of the bridging clutch 56 as a result of the rapid disengaging movement of the piston 54 and thus arrives as fresh clutch fluid in the piston space 61. Simultaneously, heated clutch fluid already present there can trickle away into the pressure space 55 via the pressure area connection 160, designed as a throttle point 80 with through-openings 81 in the piston 54. From there, the fluid can be conducted away to the fluid reservoir 95 via the second pressure medium line 62, the transition space 40, and the center bore 37 of the gearbox input shaft 36.

Figure 3:
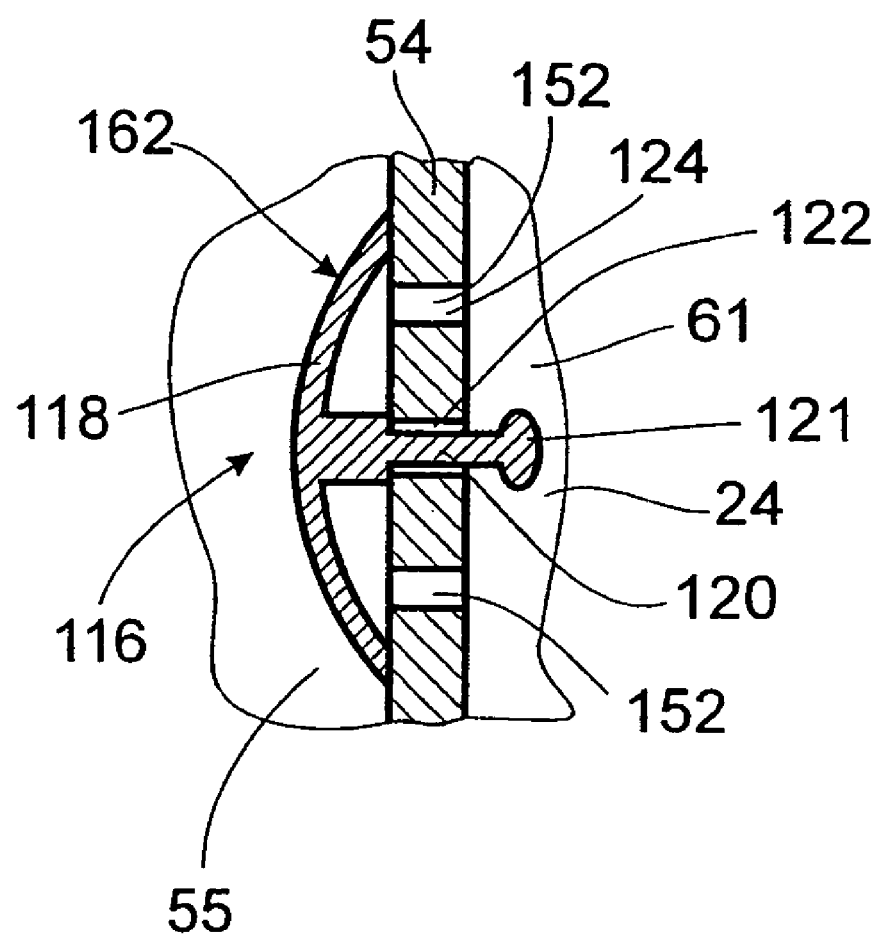
FIG. 3 shows a magnified view of a clutch fluid let-through device in the piston of the bridging clutch.

If it is desired to allow a significant exchange of clutch fluid in the hydrodynamic circuit 24 while the piston 54 is disengaged, it is possible to use the clutch fluid let-through device 162 in the piston 54, this device being designed as a nonreturn valve 116. This can be a plastic part with the shape of a mushroom, as shown in FIG. 3. It has a sealing cover 118 and an essentially cylindrical stem 120 connected to it. The stem fits axially into a guide opening 122 in the piston 54 and is held in this opening 122 by means of a knob 121 in such a way that, although it is free to shift position in the axial direction, it cannot come loose from the piston 54. Through-openings 124 are provided in the piston 54 closely adjacent to the guide opening 122 for the stem 120. All together, these openings form a flow channel 152, through which the sealing cover 118 can be subjected to force from the side of the piston space 61 when there is positive pressure in the hydrodynamic circuit 24 and in the piston space versus the pressure space 55. As a result, the sealing cover 118 is lifted from the opposite side of the piston 54 by the fluid passing through the through-openings 124, so that an escape route for clutch fluid through the flow channel 152 is opened, supplementing the throttle point 80. The degree to which the sealing cover 118 opens depends on the pressure difference between the piston space 61 and the pressure space 55, and depending on the size of cover's diameter and the number and/or size of the through-openings 124, the desired throughput of clutch fluid from the hydrodynamic circuit 24 via the piston space 61 into the pressure space 55 and from there back to the fluid reservoir 95 can be obtained.

So that the piston 54 can be engaged again, the switching device 96 is actuated by the electromagnet 104 under the command of the controller 100 in such a way that the electromagnet moves the switching valve 88 from its previous position into the position shown in FIG. 1, in which the delivery side D of the pressure source 93 is connected to the center bore 37 of the gearbox input shaft 36. Thus the pressure increases there, whereas it decreases simultaneously in the flow channels 41, 42, which are now connected to the fluid reservoir 95 by the switching valve 98. Because of this pressure and connection situation, clutch fluid is conducted from the fluid reservoir 95, via the center bore 37 of the gearbox input shaft 36 and the second pressure-medium line 62, into the pressure space 55. Supported by the rotation of the clutch housing 5 around the axis of rotation 3, the clutch fluid proceeds radially outward, but because of the seal 93, it cannot go any farther. When the pressure in the pressure space 55 increases, the sealing cover 118 of the nonreturn valve 116 is pressed against the through-opening 152. This connection of the pressure space 55 to the piston space 61 and therefore to the hydrodynamic circuit 24 is thus closed. As a result, clutch fluid present in the pressure space can enter the piston space 61 only via the throttle point 80. Once in that space, the fluid is directed radially outward by the second wall 144 of the space, which is provided on the fluid space separator 164. The rest of the clutch fluid in the piston space 61 also flows radially outward, supported by the rotation of the clutch housing 5 around the axis of rotation 3. As soon as the plates 65, 66 have made contact with each other and with the adjacent components, i.e., the piston 54 and the fluid space separator 164, the only route by which the fluid can now pass is through the grooves 70 in the friction areas 69 of the bridging clutch 56. The positive flow guide 168 provided by the fluid space separator 164 gives rise to a positively guided flow through the bridging clutch 56. The clutch fluid arriving in the hydrodynamic circuit 24 in this way will, when it's time has come to leave the hydrodynamic circuit 24, escape through the first pressure medium line 60 into the flow channels 41, 42 and proceed from there to the fluid reservoir 95.

Because of the functional assignment of the piston space 61 to the hydrodynamic circuit 24, the bridging clutch 56 is ultimately also to be considered part of the hydrodynamic circuit 24. Because, simultaneously, the piston 54 acts by way of its piston seals 82, 83 serving as the seal 170 as a separator between the hydrodynamic circuit 24 and the pressure space 55 and thus between the two pressure medium lines 60, 62 of the hydrodynamic clutch device 1, which is designed as a two-line system, both the engagement and the disengagement of the piston 54 occur without any change in the pressure curves acting on the piston 54 and are thus independent of the operating state—such as push mode—of the clutch device 1 at the moment in question.

Figure 2:
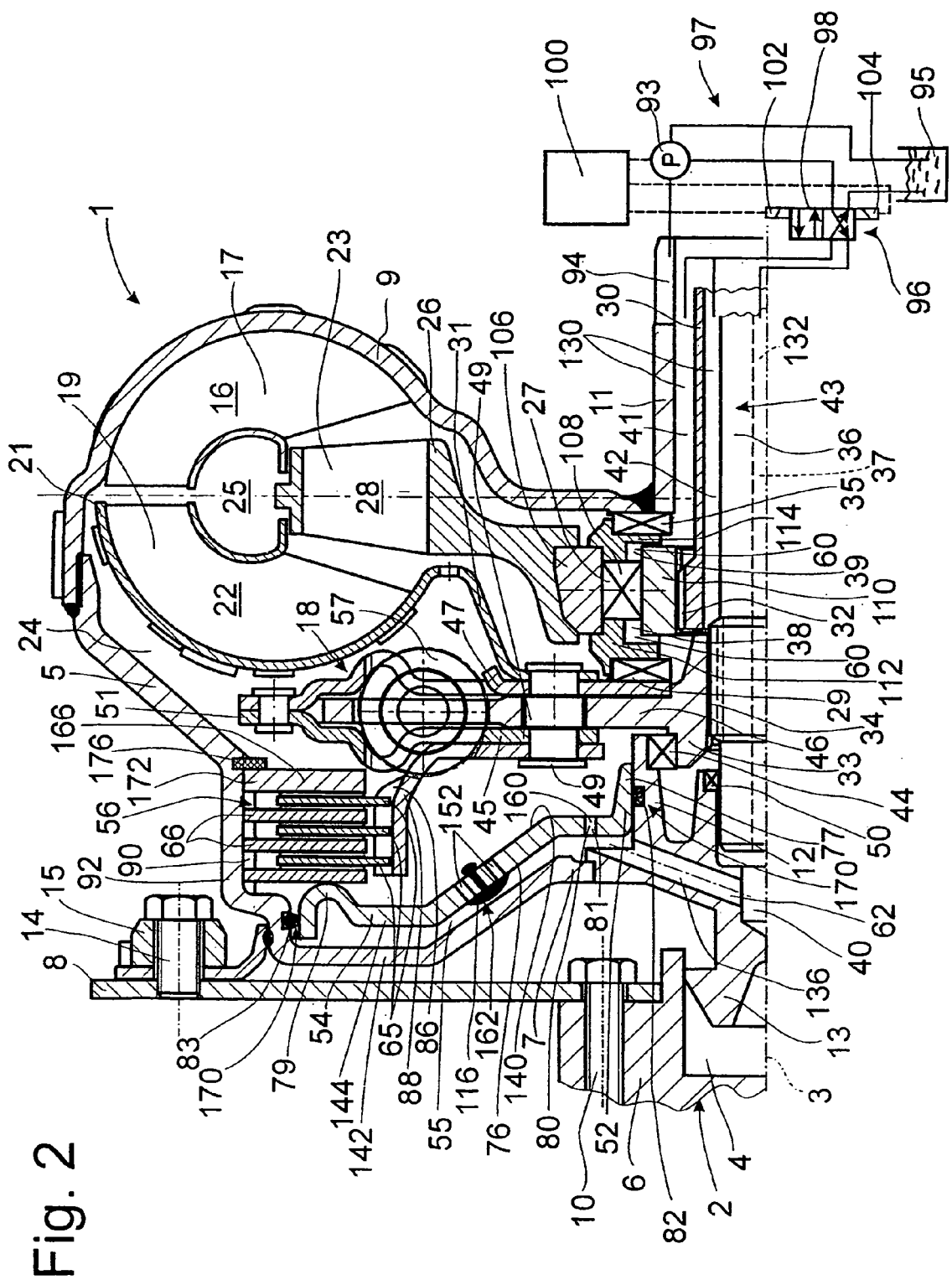
FIG. 2 shows a different design of the bridging clutch.

The embodiment according to FIG. 2 differs from that according to FIG. 1 essentially in that the fluid space separator 164 is omitted, which means that the positive flow guide 168 is also absent. Clutch fluid which has passed through the pressure area connection 160, i.e., through the throttle point 80, arrives directly in the hydrodynamic circuit 24 via a torsional vibration damper 18 to the extent that it has not been diverted by centrifugal force toward the plates 65, 66 of the bridging clutch 56. Nevertheless, the torsional vibration damper 18 can also act as a positive flow guide 168 by providing appropriate sealing means of the turbine wheel hub at least on one of the cover plates 45, 47 serving as the input part 51 and/or on a hub disk 46, serving as the output part 53. The input part 51 of the torsional vibration damper 18 is fastened together with a radially inner plate carrier 88 to the turbine wheel base 31 by through-rivets 49, whereas the clutch housing 5, that is, the radially inside surface of its circumferential area with its set of teeth 90, serves as a radially outer plate carrier 92. In addition to the radially outer plates 66, an end plate 172 also engages with these teeth 90 and thus serves the function of an axial stop 166 for the plates 65, 66 when they are being held in working connection with each other by the piston 54. The end plate 172 is held in the axial direction pointing away from the piston 54 by a locking ring 176.

With respect to the torsional vibration damper 18, it remains to be noted that damping elements 57 are provided between its input part 51 and its output part 53 so that the input and output parts have a certain freedom of relative movement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
a pump wheel;
a housing connecting the pump wheel to a drive;
a turbine wheel connected to a takeoff, the turbine wheel being located in the housing and cooperating with the pump wheel to form a hydrodynamic circuit;
a bridging clutch located in the housing and comprising a piston located between the hydrodynamic circuit and a pressure space, said piston being movable between an engaged position, wherein the drive transmits torque to the takeoff via the bridging clutch, and a released position, wherein the drive transmits torque to the takeoff via the hydrodynamic circuit;
a pressure circuit comprising a first pressure medium line which supplies clutch fluid to the hydrodynamic circuit, and a second pressure medium line which supplies clutch fluid to the pressure space;
at least one seal effective between the piston and the housing to seal the hydrodynamic circuit from the pressure space;
at least one pressure connection comprising at least one though opening in the piston which allows an exchange of clutch fluid between the hydrodynamic circuit and the pressure space regardless of the position of the piston, and the at least one pressure connection comprising a clutch fluid passage device comprising a non-return valve,
wherein, when the piston is in the released position, the non-return valve opens to allow flow from the hydrodynamic circuit to the pressure space and closes to prevent flow from the pressure space to the hydrodynamic circuit depending on the pressure differential between the pressure space and the hydrodynamic circuit; and a fluid space separator fixed to the housing in the hydrodynamic circuit between the turbine wheel and the bridging clutch.

2. The hydrodynamic clutch device of claim 1 further comprising:
   a pump wheel hub connected to the pump wheel;
   a pressure source connected to a fluid reservoir;
   at least one first flow route provided radially between the pump wheel hub and the takeoff, the first flow route connecting the pressure source to the first pressure medium line; and
   a second flow route in the takeoff, the second flow route connecting the pressure source to the second pressure medium line.

3. The hydrodynamic clutch device of claim 1 wherein the at least one through opening is located in a radially inner area of the piston.

4. The hydrodynamic clutch device of claim 3 wherein the at least one through opening is substantially radially aligned with the point where the second pressure medium line connects to the pressure space.

5. The hydrodynamic clutch device of claim 1 wherein the non-return valve is arranged in the piston.

6. The hydrodynamic clutch device of claim 5 wherein the non-return valve comprises at least one flow opening in the piston, a sealing cover over the flow opening, and a stem connected to the sealing cover and passing though a guide opening in the piston, wherein the sealing cover moves to an open position when the pressure in the hydrodynamic circuit is greater than the pressure in the pressure space, and the sealing cover moves to a closed position when the pressure in the pressure space is greater than the pressure in the hydrodynamic circuit.

7. The hydrodynamic clutch device of claim 1 wherein the fluid space separator limits axial travel of the piston and absorbs the axial force exerted by the piston in the engaged position.

8. The hydrodynamic clutch device of claim 1 further comprising:
   a first plate carrier fixed to the fluid space separator and carrying a plurality of first plates of said bridging clutch non-rotatably but with freedom of axial movement, thereby connecting said first plates non-rotatably to said drive; and
   a second plate carrier fixed non-rotatably to said takeoff and carrying a plurality of second plates of said bridging clutch nonrotatably but with freedom of axial movement, thereby connecting said second plates non-rotatably to said takeoff.

9. The hydrodynamic clutch device of claim 1 wherein the bridging clutch has a working area with grooves which allow passage of clutch fluid, said fluid space separator acting as a positive flow guide for clutch fluid passing from the pressure space to the hydrodynamic circuit via the pressure connection of the grooves in the working area of the bridging clutch.

* * * * *